United States Patent [19]
Chauvin et al.

[11] Patent Number: 5,889,586
[45] Date of Patent: Mar. 30, 1999

[54] SYSTEM OF PHOTODETECTION AND ASSOCIATED PROCESS FOR ANALYZING A LUMINOUS FLUX

[75] Inventors: Philippe Chauvin, Longpont sur Orge; Alain Thevenon, Bretigny-sur-Orge, both of France

[73] Assignee: Instruments S.A., Paris, France

[21] Appl. No.: 810,091

[22] Filed: Mar. 4, 1997

[30] Foreign Application Priority Data

Mar. 7, 1996 [FR] France .................................. 96 02906

[51] Int. Cl.⁶ ........................................................ G01J 1/42
[52] U.S. Cl. ............................................ 356/218; 356/225
[58] Field of Search .................................. 356/218, 124, 356/124.5, 125, 126, 127, 121, 318, 243, 317, 418, 419, 417, 224–226, 228, 230, 233, 219; 250/233, 458.1, 459.1, 338

[56] References Cited

U.S. PATENT DOCUMENTS

| | | | |
|---|---|---|---|
| 2,078,768 | 4/1937 | Meier | 356/218 |
| 3,922,092 | 11/1975 | Van Den Bosch | 356/100 |
| 4,227,808 | 10/1980 | Yuasa | 356/218 |
| 4,289,399 | 9/1981 | Uchida | 356/226 |
| 4,653,882 | 3/1987 | Cerf | 354/4 |
| 4,737,029 | 4/1988 | Yabusaki et al. | 356/225 |
| 5,148,231 | 9/1992 | Ishiguro et al. | 356/126 |
| 5,243,401 | 9/1993 | Sinya | 356/318 |
| 5,408,311 | 4/1995 | Suzuki et al. | 356/124 |

FOREIGN PATENT DOCUMENTS

| | | |
|---|---|---|
| 51-126195 | 4/1976 | Japan . |
| 61-100620 | 5/1986 | Japan . |
| 2 278 434 | 11/1994 | United Kingdom . |

*Primary Examiner*—Frank G. Font
*Assistant Examiner*—Michael P. Stafira
*Attorney, Agent, or Firm*—Young & Thompson

[57] ABSTRACT

A photodetection system that analyzes a luminous flux (15) received on a line (10). The photodetection system includes an opaque mask (4) provided with at least one aperture (6), placed in the vicinity of the line, driver (7) designed to rotate the mask, detector (8, 9) of an angular position of reference of the mask, a field lens (12) concentrating the luminous flux (16) crossing the line onto a photodetector (1), and a processing unit (3) connected to the photodetector, for analyzing the luminous flux to yield values for several points on the line.

9 Claims, 3 Drawing Sheets

SYSTEM OF PHOTODETECTION AND ASSOCIATED PROCESS FOR ANALYZING A LUMINOUS FLUX

BACKGROUND OF THE INVENTION

The present invention concerns a photodetection system that analyzes a luminous flux received on a line, and a process for analyzing such luminous flux.

Multipath or multichannel detectors comprising several photo-detectors mounted side by side are fitted to take simultaneous measurements of a luminous flux in several adjacent zones. They can be used equally well for taking measurements in a single dimension and in two dimensions, the photo-detectors being mounted either in strip or matrix configuration respectively.

A multichannel photodetection system usually comprises the photo-detectors mounted side by side, amplifiers connected to the photo-detectors and a processing unit connected to the amplifiers, the latter including at least one analog-digital converter. The processing unit also includes means for multichannel processing connected to the analog-digital converter. This type of multichannel photodetection system comprising a strip of photo-detectors is capable of analyzing a luminous flux received on a line, each photo-detector receiving a portion of the luminous flux coming from one zone of the line, the various zones being adjacent.

A drawback of this type of multichannel photodetection system is its cost. Moreover, any change in the properties of the photo-detectors, for example in their sensitivity, can only be remedied by replacing the entire strip of photo-detectors.

SUMMARY OF THE INVENTION

The object of the present invention is to provide a photodetection system capable of analyzing a luminous flux received on a line with a high degree of accuracy and very good resolution at a lower cost than that of a strip of photo-detectors.

The proposed photodetection system should also offer good repeatability of measurements taken under identical conditions.

The invention also concerns a system of photodetection analyzing a luminous flux received on a line that enables photodetection properties such as sensitivity to be changed easily and at reduced cost.

The invention covers such photodetection systems compatible with means of multichannel processing used in association with multichannel detectors.

The invention also concerns a process for analyzing a luminous flux received on a line that offers similar capabilities to those obtained with a multichannel detector but that costs considerably less to implement.

To this end the invention concerns a photodetection system that analyzes a luminous flux received on a line, the system comprising:

a photodetector, an amplifier connected to the photodetector, a processing unit connected to the amplifier comprising an analog-digital converter.

The photodetection system is characterized by the fact that it also comprises:

an opaque mask fitted with at least one aperture located in the vicinity of the line, drive means designed to rotate the mask, means of detecting a reference angular position of the mask designed to provide the processing unit with an angular reference signal, a field lens concentrating the luminous flux crossing the line onto the photodetector.

The processing unit is provided with a memory capable of storing data representing the aperture, and also capable of analyzing the luminous flux to yield values for the luminous flux at various points on the line.

The photodetection system of the invention therefore makes it possible to use a single photodetector to analyze a luminous flux at a variety of points on the line instead of using a strip of photo-detectors where there is one photo-detector for each point. Such analysis may be effected extremely rapidly, the speed of the operation being determined by the rotation speed of the mask and the acquisition speed of the analog-digital converter.

In a configuration in which the photodetection system comprises several photo-detectors, each photodetector is capable of analyzing the luminous flux at various points on the line, thereby multiplying the capabilities of the same photo-detectors used in a conventional photodetection system using a strip of photo-detectors.

The presence of a single photodetector, or a very limited number of photo-detectors, makes the photodetection system of the invention significantly less costly than multichannel photodetection systems. Moreover, it is easy to replace a single photodetector or a small number of photo-detectors. This makes changing detection properties easier and less costly than on multichannel detectors.

The photodetection system of the invention also gives excellent resolution compared with multichannel detectors since resolution is largely determined by the width of the aperture and the surface area of the photodetector.

It is preferable for the analog-digital converter to produce successive digitized values for the luminous flux at the points on the line, the processing unit comprising means for analyzing the values connected to the analogdigital converter. These means of analysis are designed to collect and give averages for digitized values within various zones of the line, each of these zones comprising some of the points, in such a way as to generate mean values for the luminous flux in the zones.

The operations performed by the means of analysis have the effect of increasing the signal-to-noise ratio and consequently the accuracy of results.

In this preferred embodiment of the photodetection system of the invention the processing unit advantageously comprises means of multichannel processing linked to the means of distribution and processing the mean value of luminous flux in each zone.

Therefore the standard software and electronic units used in multi-channel detectors may be used unmodified in the photodetection system of the invention.

The drive means provided should preferably ensure that the mask rotates at a constant speed.

In particular this constant rotation speed ensures good repeatability of results.

It is judicious for the drive means to comprise a micro-step system connected to an accurate clock that transmits drive pulses, the micro-step system being capable of controlling the angular position of the rotating mask with each pulse.

It is also advantageous if the angular position detection means are capable of detecting several reference angular positions of the mask and transmitting the corresponding angular reference signals to the processing unit. These angular positions comprise a primary position used to initialize a recording and possibly at least one secondary position used to effect at least one resetting of the recording.

In one advantageous embodiment the mask consists of a transparent base covered with at least one layer of an opaque material, the aperture being made in the opaque material.

The mask is advantageously fitted with a filter designed to select some of the wavelengths of the luminous flux to be analyzed.

Given that the luminous flux received on the line extends more or less over a width transversal to the line, it is preferable for the aperture to scan a width approximately equal to this transversal width.

The invention also concerns a process for analyzing a luminous flux received on a line. In this process:

the luminous flux is detected with a photodetector that generates an electrical signal, the signal is electrically amplified, the electrical signal is digitized by means of an analog-digital converter in such a way as to produce digitized values representing the luminous flux. The process of the invention is characterized by the fact that before detecting the luminous flux:

it is passed through a window cut in an opaque mask mounted in the vicinity of the line, this window being modified over time by rotation of the mask, preferably at a constant speed, the luminous flux crossing the line is concentrated on the photodetector by means of a field lens, such that the digitized values represent the values of the luminous flux at several points on the line.

In a preferred embodiment of the analysis process of the invention digitized values are collected by zones of the line and mean values established, each zone including some of the points such that mean values for the luminous flux in the zones are generated.

BRIEF DESCRIPTION OF THE DRAWINGS

The invention will be understood better by referring to particular embodiments and implementations illustrated by the attached drawings.

DESCRIPTION OF THE PREFERRED EMBODIMENTS

Figure 1:
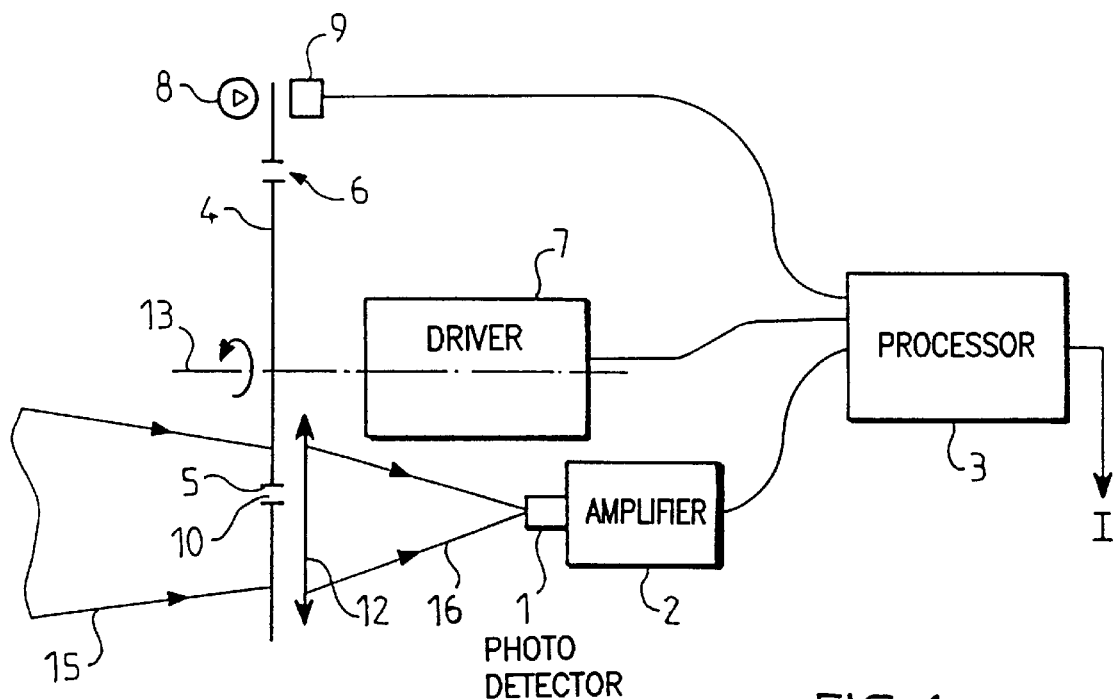
FIG. 1 is a schematic diagram of a photodetection system built according to the invention in operation.

A photodetection system, as seen in FIG. 1, is designed to analyze a luminous flux 15 falling upon a line 10. The system comprises a photo-detector 1 associated with an amplifier 2, connected to a processing unit 3 capable of producing the intensity I of the luminous flux 15 received on line using signals transmitted by amplifier 2.

Photodetector 1 may, for example, use doped or undoped InGaAs, PbS or PbSe technology.

The photodetection system also comprises an opaque mask 4 located in the vicinity of line 10. This mask 4 is provided with a transparent section 6 that forms a window 5 in the trajectory of luminous flux 15 received on line 10. Mask 4 is designed to be rotated by drive means 7. It therefore advantageously consists of a disk rotated around axis 13. The transparent section 6 is cut such that rotation of mask 4 causes displacement of window 5 along line 10, thereby producing a rapid spatial scan of line 10. The scan may be total or partial and may include discontinuities.

Figure 2:
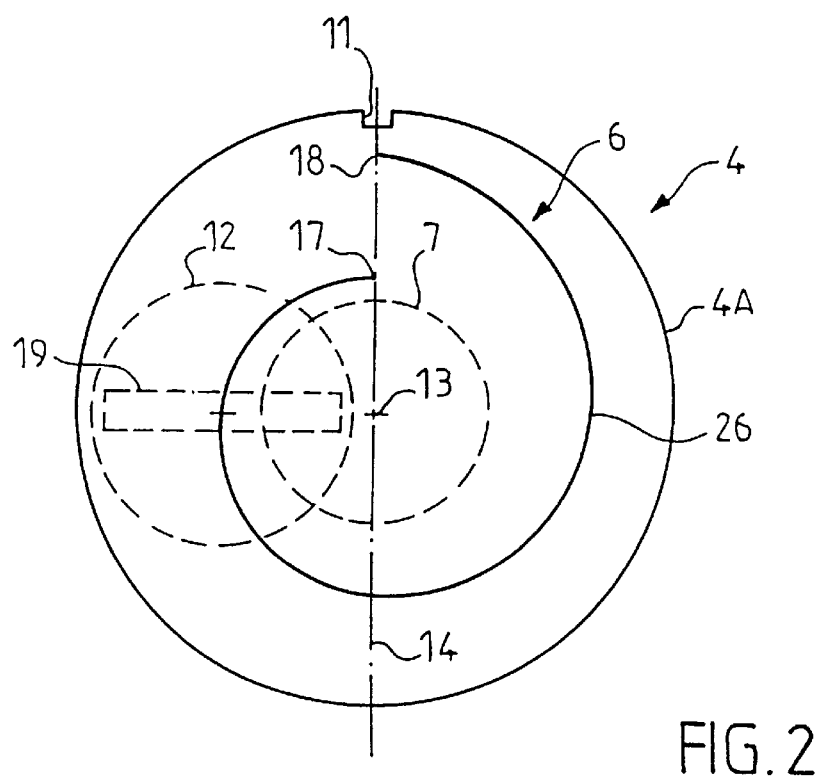
FIG. 2 is a front view of a first embodiment of the mask used in the system shown in FIG. 1.

In a first preferred embodiment of mask 4, shown in FIG. 2, the mask consists of a disk 4A fitted with an aperture 26 constituting transparent section 6. Aperture 26 is in the form of a spiral centered on axis 13. Moreover extremities 17 and 18 of aperture 26 are located on the same axis 14 that is a diameter of disk 4A. Therefore one complete rotation of mask 4 around its axis 13 causes continuous displacement of window 5 along line 10, or a portion thereof, between the times when extremities 17 and 18 of aperture 26 are respectively located in front of line 10. Spiral aperture 26 is a slit whose width has a determining effect on the resolution of the photodetection system. Since luminous flux 15 received on line 10 extends more or less across a width transversal to line 10 in the plane of mask 4, the width scanned by aperture 26 has the advantage of being more or less equal to this transversal width.

The radius of disk 4A is determined according to the length of line 10 on which the luminous flux 15 to be measured is received. This radius may, for example, be of the order of 50 mm.

Mask 4 should preferably be a glass disk. Using photogravure techniques an opaque material (for example a metallic material) is deposited on the glass disk to the exclusion of an area in the shape of a spiral thereby constituting aperture 26. The disk may also be entirely coated with the material, aperture 26 being subsequently engraved into it. The glass disk is then treated to give it a black color that allows very little light to penetrate, at least from the wavelengths being measured. Light can therefore only pass through mask 4 through the slit constituting aperture 26. The glass used may, for example, be a borosilicate, disk 4A having a thickness of 1 mm and aperture 26 a width of 50 μm.

It may prove useful to add a filter to mask 4 designed, for example, to select only some wavelengths passing through aperture 26. In a first method of adding a filter, a thin layer of a filtering material is deposited on the glass slit or on a section of this slit. The filtering material may, for example, be germanium. In a second method of adding a filter, a rectangular filter is placed parallel to disk 4A in its immediate vicinity and near line 10.

Although the filter may be placed in front of disk 4A or behind it, it is preferable for it to be placed on the side nearest photodetector 1. It may cover only a portion of aperture 26 and several different filters may be placed in different zones of aperture 26.

Embodying mask 4 by means of a glass disk is particularly advantageous because it enables a slit to be created without discontinuity of material, it gives good flatness, rigidity and balance to disk 4A as well as a very small width of slit.

The engravement of the slit or aperture 26 provides an acurate positioning and stability of this aperture 26. It also makes it possible to make and to use a very narrow aperture 26. That all together gives a sharp resolution of the measure along line 10.

The glass to be used for the disk is to be related to the luminous flux, particularly the wavelength of it. When infra red is concerned a silicium disk has to be used.

The opacity of the disk can be provided by a chromium deposit. Other layers can be deposited on the disk for having effect on the luminous flux to be transmitted by the aperture 24. This can be antireflexion coating, wide wavelength selection coating . . . .

It is, however, also possible to construct mask 4 out of a compact disk in which slits have been machined, for example by chemical or laser cutting methods. This type of disk may be made of aluminum. In this embodiment of disk 4A, ties must be placed along the length of spiral aperture 26 to give the part added mechanical strength, causing discontinuities in scanning of line 10 by window 5. Moreover the thickness of disk 4A must not exceed the width of aperture 26. This is why consolidation of disk 4A is necessary in order to resist distortion during rotation.

In order to limit the luminous flux interference liable to be transmitted to photoreceptor 1, a rectangular slit 19 whose longer axis is parallel to line is advantageously positioned near mask 4, in front of or behind the mask, in order to allow luminous flux to pass only in the vicinity of line 10.

The transparent section 6 of mask 4 may have a different form depending on the type of spatial scanning of line 10 required. Thus in a second embodiment of mask 4, shown in FIG. 6, this consists of a disk 4B in which the transparent section 6 is in the form of a spiral as in the first embodiment of mask 4 with the difference that it consists of a series of successive apertures 27 along this spiral form. In the illustrated example, the transparent section 6 consists of eight apertures 27 separated by seven opaque bridges 29. Disk 4B may be used to distinguish eight distinct zones along line 10. If mask 4 is an opaque disk in which a slit has been machined, opaque bridges 20 will be necessarily present in the form of ties giving disk 4B its mechanical strength.

Figures 6, 7:
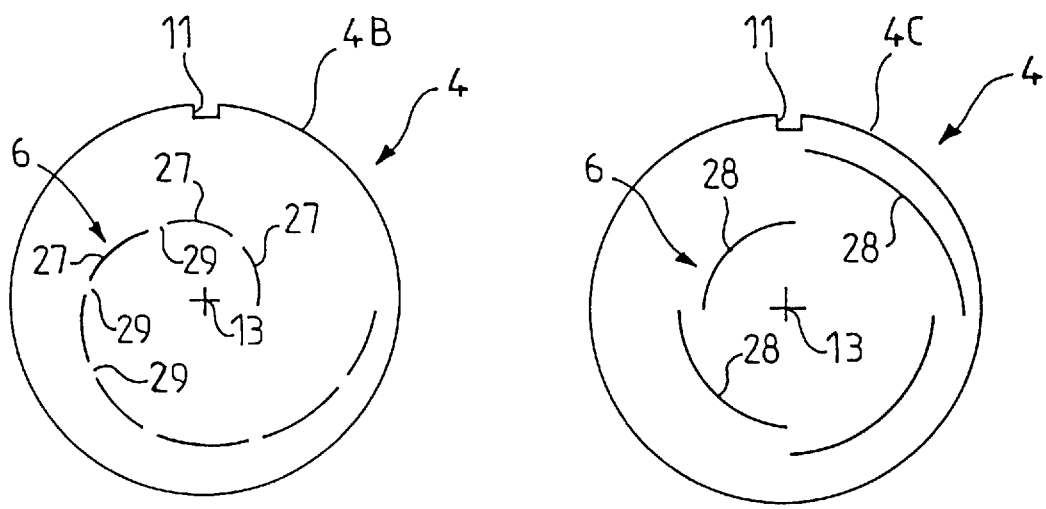
FIG. 6 shows a second embodiment of the mask used in the system shown in FIG. 1.
FIG. 7 shows a third embodiment of the mask used in the system shown in FIG. 1.

In a third embodiment of mask 4, shown in FIG. 7, the mask is a disk 4C whose transparent section 6 consists of apertures 28 that are positioned more or less in the shape of a spiral but that allow for radial discontinuities around axis 13. In contrast with the second embodiment of mask 4, openings 28 do not cause orthoradial discontinuity, thereby allowing luminous flux 15 to pass uninterrupted through disk 4C during rotation of the disk. However, transparent section 6 is provided to select discontinuous zones along line 10. In the drawing these zones happen to be four in number. Spatial scanning of line 10 by window 5 is therefore discontinuous.

The photodetection system also includes means for detecting a reference angular position of mask 4 designed to transmit an angular reference signal to processing unit 3. In one embodiment the detection means consist of a notch 11 cut into mask 4, a light source or diode 8 and a photoelectric receiver 9. Light source 8 and receiver 9 are positioned facing one another on either side of mask 4. When notch 11 is located in front of light source 8, detector 9 supplies an angular reference signal. Notch 11 may be replaced with any kind of aperture in mask 4. Receiver 9 is connected to processing unit 3 and is provided to transmit the angular reference signal to processing unit 3. Instead of a reference point cut into mask 4, the means for detecting a reference angular position may also include a reference point on drive means 7. In this case the drive means are connected to processing unit 3.

The means for detecting angular position are advantageously provided with several reference points suitable for detecting several reference angular positions of mask 4 and transmitting the associated angular reference signals to processing unit 3. Several resettings are therefore possible, giving increased reference accuracy and allowing the rotation of mask 4 to be more accurately monitored if necessary. Angular positions comprise a main position designed to initialize a recording, and one or more secondary positions designed to provide at least one resetting of the recording.

Drive means 7 advantageously include an electric motor capable of giving mask 4 a constant rotation speed. This motor is preferably a pulse motor connected to an accurate clock that emits control pulses. The pulse motor is provided to position mask 4 accurately during rotation. Each pulse received from the clock triggers a one-step rotation movement. The pulse motor therefore constitutes a micro-step system that very accurately ensures a constant rotation speed.

The accurate clock may consist of a quartz crystal incorporated in the motor. It may also be incorporated in processing unit 3 and connected to drive means 7 so that it transmits digital pulses to the pulse motor.

In an example of a pulse motor, drive means 7 comprise a control logic circuit, a power stage, a stator and a rotor. Digital pulses transmitted by processing unit 3 are transformed by the control logic circuit into a signal that is amplified by the power stage. The amplified signal powers the stator windings and the permanent magnet constituting the rotor adopts a position of magnetic equilibrium in which the poles of the rotor are aligned with the poles of the stator. Since the control pulses are counted, no reply signal giving the position of the rotor is necessary in this open-loop control system. The pulse motor may, for example, use 400 pulses per rotation.

Although a pulse motor is particularly suitable for giving constant rotation of mask 4, it would also be possible to use a direct current motor. In this case a closed-loop control system would be desirable to improve the constancy of rotation speed.

It is preferable for drive means 7 to be coordinated with detection means 8, 9 and 11 by processing unit 3 to which they are connected. The angular position of mask 4 can therefore be measured accurately and its rotation precisely monitored.

The photodetection system also includes a field lens 12 designed to concentrate the luminous flux crossing line 10 onto photodetector 1. The field lens may advantageously constitute the aperture diaphragm image of an optical system forward of the photodetector. If incident lumninous beam is parallel, the focal point of field lens 12 will be in the vicinity of photodetector 1. For example, lens 12 can be a borosilicate aspherical condenser capable of eliminating spherical and coma aberrations and have a focal length of 30 mm.

Figure 3:
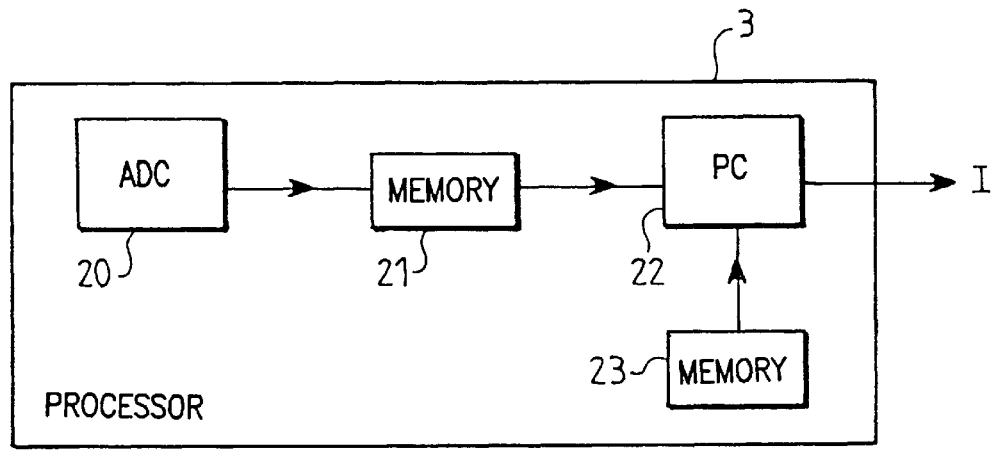
FIG. 3 is a schematic diagram of the processing unit used in the system shown in FIG. 1.

Processing unit 3, of which FIG. 3 is a schematic diagram, includes an analog-digital converter 20. Converter 20 is preferably included in a data acquisition board. It has a data acquisition or digitization frequency that is constant and very stable. This frequency may, for example, be 200 kHz in 16-bit mode, which gives it a capacity of 200,000 operations per second for $2^{16}$ intensity levels of luminous flux measured. Operations performed by converter 20 are started and stopped by the angular reference signal transmitted to processing unit 3 by detection means 8, 9 and 11.

Processing unit 3 also includes a processor 22 incorporated in a computer, for example a PC. Processor 22 is connected to converter 20 via a first data storage memory 21. Processing unit 3 also includes a second data storage memory 23 connected to processor 22. This second memory 23 is provided to store data representing transparent section 6, i.e. apertures 26, 27 and 28. Processor 22 can access these data to determine the intensity I of the luminous flux to be analysed.

In a first embodiment of processing unit 3, the unit comprises a data acquisition board that includes both converter 20 and first memory 21. The data acquisition board therefore constitutes an independent controller capable of storing data in its built-in memory. Data stored in first memory 21 are subsequently read by the computer comprising processor 22.

In a second embodiment of processing unit 3, data acquisition board transmits data directly to the computer. First memory 21 is therefore included in the computer and the data acquisition board only includes a simple buffer memory.

Using data from converter 20 and second memory 23, processor 22 can calculate the intensity I of luminous flux 15 received on line 10 at various points.

Processor 22 preferably comprises means of analysis designed to collect and calculate averages of data for predefined zones of line 10. Processor 22 therefore establishes the intensity of the mean luminous flux in each zone. The data thereby obtained are identical to those that would be obtained using a multi-channel detector, each zone being the equivalent of a photodetector on a hypothetical strip. In this preferred embodiment processor 22 may also comprise the standard softwares and electronic units that are used in multi-channel detectors. The software may, for example, include processing capabilities such as smoothing and display.

Figure 4:
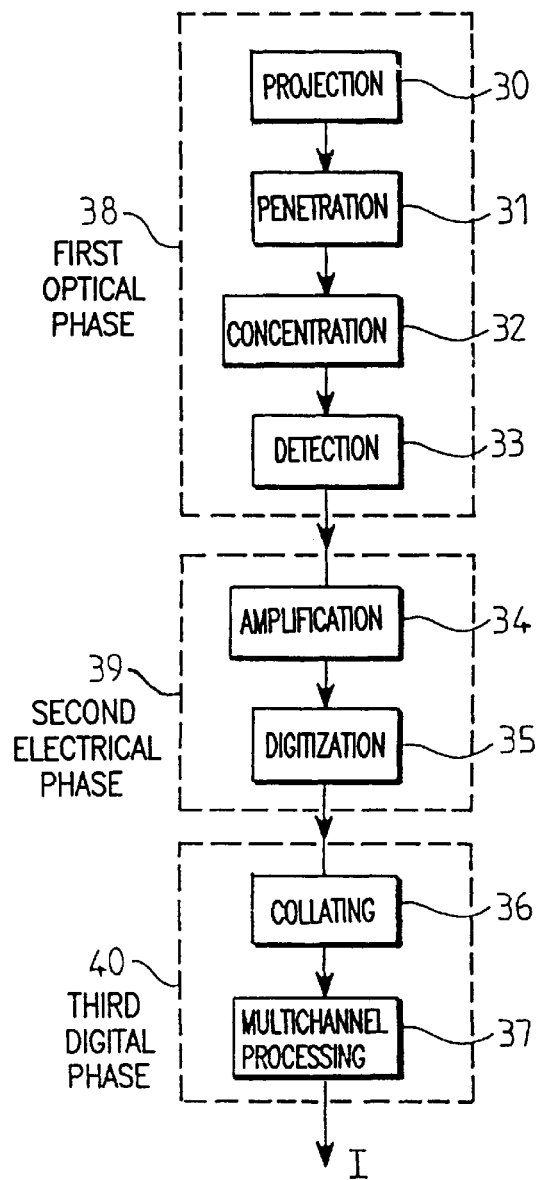
FIG. 4 is a flow-chart showing the main steps in the process of analyzing a luminous flux using the system shown in FIG. 1.

In operation the following stages are carried out successively as shown in the flow-chart in FIG. 4. During the first, optical, phase 38, projection of luminous flux 15 onto line 20 is followed by penetration 31 of window 5 and concentration 32 by field lens 12. Luminous flux 16 obtained from luminous flux 15 after passing through window 5 and lens 12 reaches photodetector 1 which uses luminous flux 16 to produce an electric signal during detection stage 33. During a second, electrical, phase 39, amplification 34 of the electric signal is performed by means of amplifier 2, followed by digitization 35 of the signal by means of converter 20. Finally, during a third, digital, phase 40, that includes collating 36 of mean values for data from predefined zones, and multi-channel processing 37, analysis of luminous flux 15 received on line 10 is completed.

Figure 5:
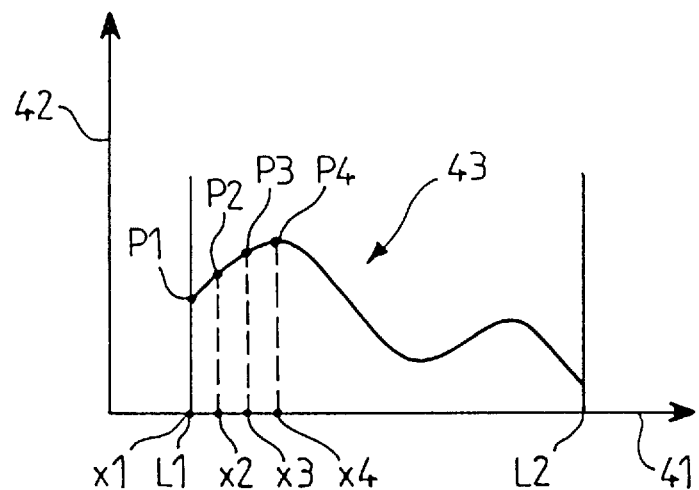
FIG. 5 shows the flux measured on the reception line using the system shown in FIG. 1, the luminous flux being shown by a curve giving its intensity in relation to the abscissa on this line.

In an example of an application, the processing unit comprises an acquisition board with a frequency of 200 kHz in 16-bit mode, mask 4 is disk 4A driven at a rotation speed of 1 Hz, and luminous flux 15 received on line is detected between abscissas L1 and L2. Luminous flux 15 having an intensity curve 43 (axis 42) in relation to the abscissa (axis 41) along line 10, as plotted in FIG. 5, processor 20 generates 200,000 data items distributed over curve 43 during one rotation of disk 4A. In the example the 200,000 points are distributed over 1,000 adjacent zones. Each zone is centered on a point Xi and contains 200 points. The mean of the intensities for each zone gives a mean value Pi for the luminous flux received in the zone. The signal-to-noise ratio is thereby significantly increased. Each zone has a 1 ms integration time which is the time available for calculating the mean of the intensities. It will be understood that the apparent resolution of the photodetection system may be chosen at random, depending on the number of zones defined. In the present case, the single-channel photodetection system operates in a very brief time-space (one second) like a multi-channel detector with a strip of 1,000 photodetectors, i.e. with 1,000 pixels for line 10.

The photodetection system and analysis process covered by the invention may be used in several fields, particularly in imagery or spectroscopy. When used in spectroscopy, a dispersion system capable of dispersing an incident luminous flux into spectra is placed before mask 4 so as to generate light beam 15.

The references placed after the technical characteristics given in the claims are intended only to assist understanding and in no way limit the scope of the claims.

What is claimed is:

1. A photodetection system for analyzing linearly arrayed luminous flux, comprising:

a photodetector for detecting luminous flux;

an amplifier connected to said photodetector for amplifying luminous flux indications from said photodetector;

a processing unit connected to said amplifier for processing luminous flux indications from said amplifier;

an opaque mask having a reference position and at least one angularly extended aperture for passing the luminous flux to said photodetector, said angularly extended aperture having plural opening portions, each of said plural opening portions for passage of luminous flux from a different linear portion of the linearly arrayed luminous flux;

a lens for concentrating the luminous flux passing through said aperture onto said photodetector;

drive means for rotating said mask; and means for detecting an angular position of the reference position and for providing a signal to said processing unit indicating the detected angular position, said processing unit comprising a memory storing a relationship of said plural opening portions to the reference position, an analog-to-digital converter for producing digitized values of the luminous flux indications, and analyzing means connected to said analog-to-digital converter and said memory for providing for each of said plural opening portions an average of plural of the digitized values of the luminous flux indications to provide an average luminous flux value for each different linear portion of the linearly arrayed luminous flux.

2. The system of claim 1, wherein said angularly extended aperture comprises a single spiral opening that is continuous for 360° of arc and said plural opening portions are parts of said spiral opening.

3. The system of claim 1, wherein each of said plural opening portions is separated from adjacent ones of said plural opening portions by a part of said mask, and each of said plural opening portions is a separate arcuate section of a spiral.

4. The system of claim 1, wherein said plural opening portions are at different radial distances from a center of said mask.

5. The system of claim 1, wherein said drive means is for rotating said mask with a constant rotational speed.

6. The system of claim 5, wherein said drive means comprises a micro-step system and a clock for transmitting drive pulses, said micro-step system for controlling angular rotation of said mask based on the pulses from said clock.

7. The system of claim 1, wherein said mask comprises transparent base covered with at least one layer of opaque material, said aperture being made in the opaque material.

8. The system of claim 1, wherein said analyzing means comprises multi-channel processing means for processing the average values of the luminous flux for each of said plural opening portions.

9. A method for analyzing linearly arrayed luminous flux, comprising the steps of:

passing the luminous flux for each linear portion of the linearly arrayed luminous flux through a different portion of an aperture in an opaque mask by rotating the mask, the aperture being angularly extended and having plural opening portions that are each for passage of luminous flux from a different linear portion of the linearly arrayed luminous flux;

receiving the luminous flux passed through the mask with a photodetector;

amplifying luminous flux indications from the photodetector;

while rotating the mask, detecting an angular position of the mask by referring to a reference position on the mask; and processing luminous flux indications from the amplifier to provide for each of the plural opening portions an average of plural digitized values of the luminous flux indications to provide an average luminous flux value for each different linear portion of the linearly arrayed luminous flux, based on a relationship of the plural opening portions to the reference position in a memory and digitized values of the luminous flux indications from a digital-to-analog converter.

\* \* \* \* \*